United States Patent [19]

Decossas et al.

[11] Patent Number: 5,083,028
[45] Date of Patent: Jan. 21, 1992

[54] INDIVIDUAL MEASURING DEVICE FOR THE NEUTRON DOSE EQUIVALENT

[75] Inventors: Jean-Louis Decossas, Oradour Sur Glane; Jean-Claude Vareille, Saint Victurnien; Jean Barthe; Guy Portal, both of Massy, all of France

[73] Assignee: Commissariat A L'Energie Atomique, Paris, France

[21] Appl. No.: 505,665

[22] Filed: Apr. 3, 1990

[30] Foreign Application Priority Data

Apr. 5, 1989 [FR] France .................. 89 04469

[51] Int. Cl.$^5$ .................................................. G01T 3/08
[52] U.S. Cl. ............................. 250/390.03; 250/370.05
[58] Field of Search ............ 250/390.01, 390.03, 250/370.09

[56] References Cited

U.S. PATENT DOCUMENTS

| | | | |
|---|---|---|---|
| 3,581,091 | 9/1968 | Meijer | 250/370.05 |
| 3,898,466 | 8/1975 | Kawashima | 250/390 |
| 3,940,627 | 2/1976 | Klar | 250/390.01 |
| 4,197,463 | 4/1980 | Todt et al. | 250/390.01 |
| 4,445,036 | 4/1984 | Selph | 250/370.03 |
| 4,489,315 | 12/1984 | Falk et al. | 340/600 |
| 4,678,916 | 7/1987 | Thomson | 250/370.07 |
| 4,757,202 | 7/1988 | East | 250/370.05 |
| 4,893,017 | 1/1990 | Kronenberg | 250/370.09 |

OTHER PUBLICATIONS

A New Type Personnel Neutron Dosimeter with Thin Si Detectors. F. Shiraishi et al., 8100 I.E.E.E. Transactions on Nuclear Science, 35 (1988) Feb., No. 1 of Two Parts, New York, NY, USA.

*Primary Examiner*—Jack I. Berman
*Assistant Examiner*—Richard Hanig
*Attorney, Agent, or Firm*—Finnegan, Henderson, Farabow, Garrett & Dunner

[57] ABSTRACT

Individual measuring device for the neutron dose equivalent comprising a detector (10) constituted by two identical diodes (13, 14). The first diode (13) is covered by a charged particle neutron converter (16). Converter (16) and the second diode (14) are covered by a protective screen (12). A differential measurement is performed between the signals from the two diodes (13, 14), which makes it possible to eliminate spurious noise. The result of the subtraction is multiplied by a given coefficient to obtain the neutron dose equivalent.

Application to radiation protection.

16 Claims, 1 Drawing Sheet

INDIVIDUAL MEASURING DEVICE FOR THE NEUTRON DOSE EQUIVALENT

BACKGROUND OF THE INVENTION

Description of the Related Art

The present invention relates to an individual device for measuring the neutron dose equivalent and which is more particularly applicable to radiation protection.

The safety of technical and research personnel who may be exposed to radiation means that it is constantly necessary to monitor the doses absorbed in the form of a dose equivalent corresponding to the biological risk of the physical measurement. It is in particular important to determine the neutron flux and by conversion, as a result of conversion coefficients experimentally and theoretically defined by the International Commission on Radiation Units (ICRU), the neutron dose equivalent.

Several devices are known making it possible to determine the neutron dose equivalent.

A first device uses the neutron albedo on a body, which produces a low energy neutron flux irradiating a thermoluminescent material. On heating the irradiated body, the latter emits light in proportion to the dose received. This device suffers from the disadvantage of being a passive system, which only supplies the result of the measurement after heating, so that it is not possible to follow in real time the evolution of the absorbed doses.

Another type of passive detector is the solid state detector. A film subject to irradiation records traces corresponding to each passage of a charged heavy particle. The film is supported by a badge worn by the user.

In order to give a reading the film is developed and this operation generally takes about 4 hours. Then each recorded trace is associated with the passage of a particular particle type and then the neutron flux density is determined, which makes it possible to calculate the dose equivalent. Here again, the measurement is not instaneous. The reading of the traces is an arduous task requiring a considerable amount of time, roughly a week being needed to process about 100 badges.

Another type of device called the "tissue equivalent proportional counter" is formed by a cathode produced from a material equivalent to a biological tissue which, under the effect of a neutron bombardment, emits charged secondary particles. The measurement of the energy loss of these particles during the passage of a gas equivalent to a biological tissue makes it possible to determine the dose equivalent. In order to be able to operate such a device requires a power supply able to provide a voltage between 500 and 1000 V, which leads to the obvious problems and dangers for the user as a result of the use of a high voltage.

OBJECTS OF THE INVENTION

The object of the present invention is to provide an individual device measuring the neutron dose equivalent and not suffering from the disadvantages of the prior art detectors. No matter what the energy of the incident neutrons, the neutron flux density is converted into a count rate permitting the determination of the dose equivalent.

SUMMARY OF THE INVENTION

For this purpose, the invention recommends a differential measurement of signals from two identical diodes forming the sensor and exposed to neutron bombardment. One of these diodes is covered with a material converting the incident neutrons into charged particles, whereas this does not apply to the other diode, which serves as a control. This makes it possible to achieve freedom from spurious signals which disturb the measurement (noise and contribution of the diodes).

The low voltage-operated device according to the invention does not constitute an electrical hazard. As an active detector, it instantaneously supplies the result of the measurement without a long and tedious treatment. Moreover, it is possible to add to it an alarm triggered when the dose equivalent passes beyond a predetermined threshold, whilst also being efficient. The device according to the invention can be easily transported as a result of its small overall dimensions and weight. It can be attached to the trunk or to any other part of the user's body.

More specifically, the present invention relates to an individual device for measuring the neutron dose equivalent comprising:

(A) a detector having a first diode, a second diode identical to the first, the two diodes being juxtaposed, a converter for converting neutrons into charged particles covering the first diode and a neutron-transparent screen covering the converter and the second diode, said screen protecting the converter and the second diode from charged particles coming from the exterior of the detector, (B) a differential system connected to the two diodes and supplying on an output a digital differential signal, which has a value substantially proportional to the dose equivalent due to the neutrons having penetrated the converter, (C) a multiplier connected to the output of the differential system and which multiplies the differential signal by a determined coefficient and which supplies on an output a digital signal representing the dose equivalent and (D) an electric power supply.

For each conversion by the converter of a neutron into a charged particle, the first diode excited by said particle will emit a current pulse, whose amplitude is correlated with the energy of the particle. However, the measurement is disturbed by spurious pulses due to the thermal noise of the diode during the passage of the electrons created by gamma radiation. The second diode, identical to the first, is not exposed to the charged particles from the converter, so that it only supplies spurious pulses. The subtraction of the count rates of the pulses from the two diodes makes it possible to obtain the count rate of the pulses whose origin is an incident neutron.

According to a special embodiment, the differential system comprises:

a first preamplifier supplying on an output pulse signals, a second preamplifier supplying on an output pulse signals, a first discriminator connected to the output of the first preamplifier and only supplying on an output pulse signals from the first preamplifier whose amplitude exceeds a threshold, a second discriminator connected to the output of the second preamplifier and only supplying at an output pulse signals from the second preamplifier whose amplitude exceeds said threshold, a first counter connected by a first input to the output of the first discriminator, by a second input to the output of the second discriminator and supplying on an output the differential signal resulting from a subtraction between the number of pulses counted on the first input and the number of pulses counted on the second input.

In order to avoid the subtraction of excessive count rates having an excessive margin of error, no account is taken, as a result of the discriminator, of the low amplitude pulses mainly due to spurious effects. The dose equivalent is displayed by a display system connected to the output of the multiplier.

In a special embodiment, the device comprises an alarm system connected to the output of the multiplier and which is triggered when the neutron dose equivalent exceeds a fixed threshold.

According to a variant, the device comprises a second counter connected by a first input to the output of the first discriminator and by a second input to the output of the second discriminator, said counter counting down, as from a predetermined initial value, each pulse received on its first input and counting up at each pulse received on its second input, said counter supplying on an output a zeroing signal and reassuming the initial value after each zero passage. The output of said second counter is connected to a sound and/or visual detector triggered during each zero passage of the second counter.

The power supply supplies a d.c. voltage between 2 and 100 V. The diodes have a depletion region between 10 and 100 micrometres for this voltage range.

The diodes are produced with small cross-section elements effective for the incident neutrons ($\leq 10^{-28}$ m$^2$). Thus, spurious pulses are not produced within the diodes by nuclear reactions in said elements.

According to a constructional variant of the present device the diodes are able to operate at atmospheric pressure. In this way, the device can be included in an individual controller without any particular constraint.

In a preferred manner, the screen is made from a material chosen from aluminium 27 and natural aluminium, its thickness being at least 2 mm.

The characteristics and advantages of the invention can best be gathered from the following description given in an illustrative and non-limitative manner. This description refers to the attached drawing in the form of a functional diagram of a device according to the invention.

DESCRIPTION OF THE PREFERRED EMBODIMENTS

Figure 1:
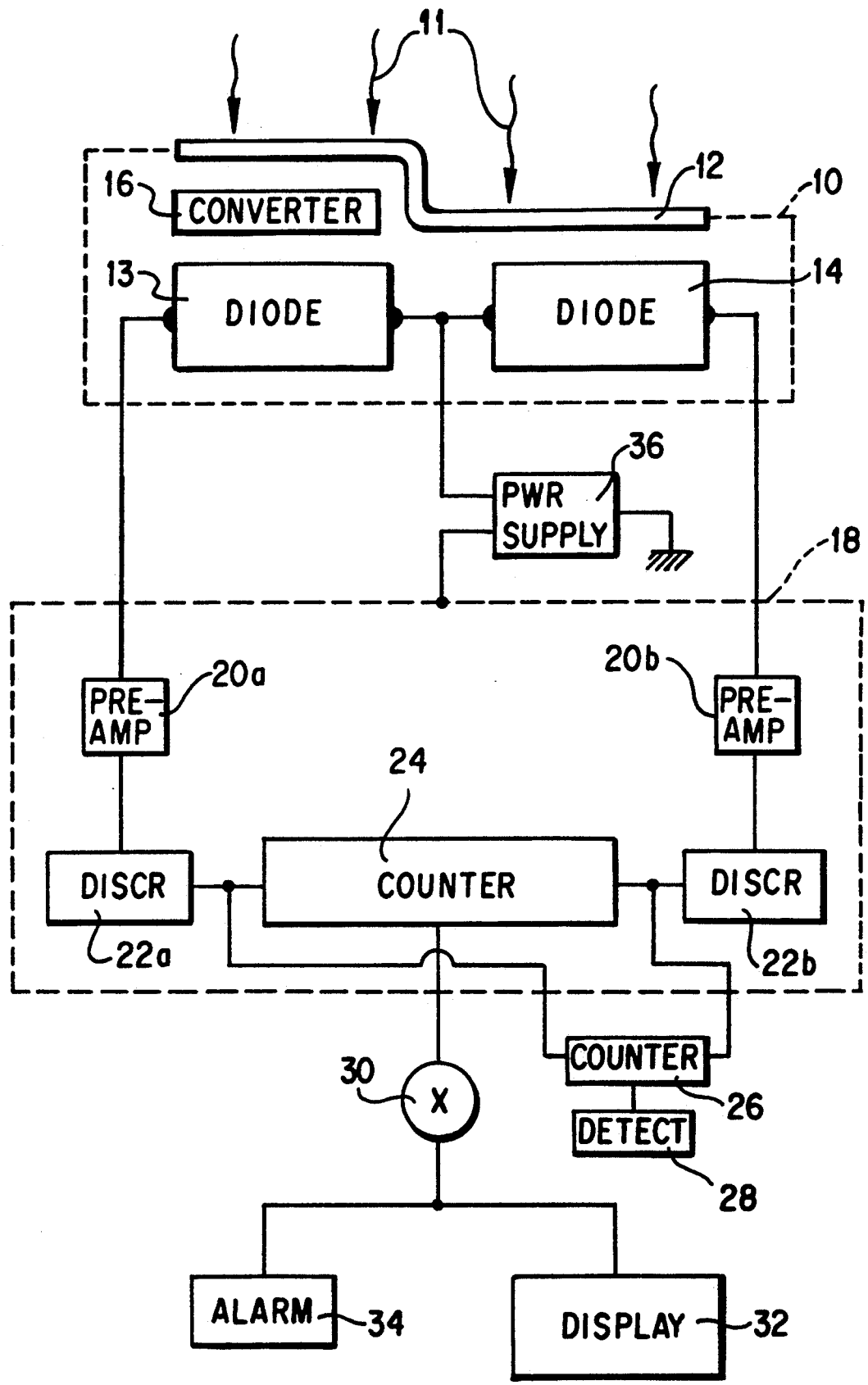
FIG. 1 is a schematic view of the preferred embodiment of the invention.

The device according to the invention comprises a detector 10, which measures the neutron flux and supplies a signal which can be processed electronically. Detector 10 comprises a screen 12 constituted, e.g., by an Al$^{27}$ sheet, protecting the diodes 13, 14 from the charged particles produced in the external medium by the passage of incident neutrons 11. This screen has a small cross-section effective for the neutrons (below $10^{-28}$ m$^2$), but its thickness, e.g., 2 mm, is adequate to stop the charged particles with an energy level equal to the highest energy of the neutron flux to be measured. Thus, screen 12 covers a charged particle neutron converter 16 and the diode 14, the converter 16 only covering diode 13.

Diodes 13 and 14 are identical, i.e. they have identical characteristics. They can be produced, e.g., in the same silicon substrate, or in different substrates, but with control parameters (polarizing voltage, etc.) adapted in a manner known to the Expert.

These diodes have a depletion region between 10 and 100 micrometers for a supply voltage between, e.g., 2 and 100 V. They are such that they operate at atmospheric pressure. Their components (contacts, implantation atoms, etc.) have a small effective cross-section for the neutrons ($\leq 10^{-28}$ m$^2$).

The active surface of the diodes 13, 14 is e.g., 4 cm$^2$. These diodes 13, 14 are juxtaposed, so that they are exposed to the same irradiation (neutron flux, gamma radiation, etc.).

The diode 13, whose active surface is covered by the converter 16, supplies a pulse signal for each passage by a charged particle (e.g. a proton). Other spurious pulses are produced by diode 13 and are due to the thermal noise and the electrons produced by the passage of gamma radiation accompanying the neutron flux.

As diode 14 is not covered by a converter 16, it only produces spurious pulses. As will become apparent from the remainder of the description, a subtraction makes it possible to obtain the neutron flux free from imprecisions due to parasitic or spurious noise.

The charged particle neutron converter 16 is made from a hydrogenated material, namely a polyethylene sheet with a thickness between, e.g., 20 micrometers and 1 mm. In said sheet are implanted atoms with a large effective cross-section for the thermal and epithermal neutrons (at least $10^{-25}$ m$^2$). These atoms are chosen from among boron, lithium or helium. Their implantation depth is between 0.1 and 0.5 micrometers and their density is, e.g., between $10^{12}$ and $10^{18}$ atoms/cm$^2$.

The choice of the sheet thickness governs its sensitivity to the fast neutrons, whilst the implantation parameters more particularly govern its response to the intermediate energy thermal and epithermal neutrons. The different parameters are chosen in such a way that the sensitivity of the converter 16 is substantially identical, no matter what the energy of the incident neutrons. In this way, the number of emitted charged particles corresponds to a flux proportional to the dose equivalent, no matter what the energy of the incident neutrons.

The neutrons 11 traversing screen 12 produce charged particles in converter 16. The latter excite diode 13, which supplies pulse signals also incorporating spurious pulses. Diode 14 only supplies spurious pulses.

A differential system 18 connected by two inputs to each of the diodes 13, 14 supplies a digital differential signal representing the counting of the neutrons which have penetrated the detector 10.

This differential system 18 comprises two counting channels, each connected to one of the diodes 13, 14. The pulses supplied by diodes 13, 14 are counted and then a subtraction takes place between the number of pulses from diode 13 and the number of pulses from diode 14.

Each counting channel comprises a charge-sensitive preamplifier 20a, 20b connected to an input of a discriminator 22a, 22b. This discriminator compares the amplitude of the pulses which it receives with a fixed threshold value. The pulses with an amplitude below said threshold are eliminated. The threshold is chosen in such a way that elimination only takes place of the pulses resulting from the thermal noise or due to gamma photons. The selected pulses are supplied to the outputs of discriminators 22a, 22b.

In this way, it is possible to considerably lower the number of pulses to be taken into account and there is no risk of saturating the counter 24 connected by two inputs to the outputs of the discriminators 22a, 22b.

This counter 24 counts the number of pulses from the second discriminator 22b and subtracts same from the number of pulses from the first discriminator 22a. On one output it supplies a digital differential signal corresponding to the number of neutrons having interacted with detector 10.

As a result of this measurement type, the spurious pulses are eliminated during subtraction. This must be understood statistically, because the spurious pulses of each diode 13, 14 are not correlated and it is not necessary for a spurious pulse from one diode to correspond with the spurious pulse from the other. However, on average, diodes 13 and 14, which have identical characteristics, in each case supply the same number of spurious signals and the measurement can be significantly improved by their subtraction.

The differential signal is multiplied by a multiplier 30 connected to the first counter 24 by a coefficient determined in such a way as to convert the number of counter pulses into a unit, such as the Sievert, which is the dose equivalent unit. The result of the measurement can be displayed on a display system 32 connected to an output of the multiplier 30.

An alarm system 34 is connected to said output. It can be a sound and/or visual signal triggered when the dose equivalent clears a fixed threshold.

In the embodiment shown in the drawing, the device comprises a second counter 26 connected by two inputs to the outputs of the discriminators 22a, 22b. This counter is connected to a sound and/or visual detector 28.

Counter 26 performs a downward count from a predetermined initial value, of the number of pulses from the first discriminator 22a. In addition, the counter is incremented on each occasion that it receives a pulse from the second discriminator 22b.

When counter 26 is zeroed, it supplies a zero passage or zeroing signal and reassumes its initial value. This signal triggers the detector, which informs the user that a fixed dose equivalent threshold has been passed.

A power supply 36 supplying a d.c. voltage, e.g., between 2 and 100 V makes it possible to polarize diodes 13, 14, as well as to supply all the electronic circuits present.

Variants are possible to such a device without passing outside the scope of the invention. The individual device can be designed in the manner of a badge, which can be attached to the user. It has small overall dimensions and its weight does not exceed 300 g. Following each use, the first counter is reset. The measured dose equivalent can possibly serve for statistical studies.

We claim:

1. Individual device for measuring the neutron dose equivalent comprising:
    (A) a detector having a first diode, a second diode identical to the first diode, the two diodes being juxtaposed, a converter for converting neutrons into charged particles covering the first diode and a neutron-transparent screen covering the converter and the second diode, said screen protecting the converter and the second diode from charged particles coming from the exterior of the detector,
    (B) a differential system connected to the two diodes and supplying as an output a digital differential signal which has a value substantially proportional to the dose equivalent due to the neutrons having penetrated the converter,
    (C) a multiplier connected to the output of the differential system and which multiples the differential signal by a determined coefficient and which supplies as an output a digital signal representing the dose equivalent and
    (D) an electric power supply.

2. Device according to claim 1, wherein the differential system comprises:
    a first preamplifier for supplying as an output pulse signals,
    a second preamplifier for supplying as an output pulse signals,
    a first discriminator connected to the output of the first preamplifier and only supplying as an output ones of the pulse signals from the first preamplifier whose amplitude exceeds a threshold,
    a second discriminator connected to the output of the second preamplifier and only supplying as an output ones of the pulse signals from the second preamplifier whose amplitude exceeds said threshold,
    a first counter connected by a first input to the output of the first discriminator, by a second input to the output of the second discriminator, and supplying as an output the differential signal resulting from a subtraction between the number of pulses counted on the first input and the number of pulses counted on the second input.

3. Device according to claim 1 comprising a display system connected to the output of the multiplier for displaying the measured neutron dose equivalent.

4. Device according to claim 1 comprising an alarm system connected to the output of the multiplier and triggered when the neutron dose equivalent exceeds a fixed threshold.

5. Device according to claim 1 comprising a second counter connected by a first input to the output of the first discriminator and by a second input to the output of the second discriminator, said second counter counting down, from a predetermined initial value, each pulse received on its first input and counting up for each pulse received on its second input, said second counter supplying on one output a zero passage or zeroing signal and reassuming the initial value after each zero passage, and a second detector connected to the output of the second counter triggered at each zero passage of the second counter.

6. Device according to claim 1, wherein the power supply supplies a d.c. voltage between 2 and 100 V.

7. Device according to claim 1, wherein the diodes have a depletion range between 10 and 100 micrometers, when they are reverse biased by a voltage between 2 and 100 V.

8. Device according to claim 1, wherein the diodes have an effective cross-section for the neutrons of at the most $10^{-28}$ m$^2$.

9. Device according to claim 1, wherein the diodes operate at atmospheric pressure.

10. Device according to claim 1, wherein the screen comprises a material chosen from among aluminium 27 and natural aluminium.

11. Device according to claim 9, wherein the screen has a thickness of at least 2 mm.

12. Device according to claim 1, wherein the converter comprises a hydrogenated material implanted with atoms having an effective cross-section for the neutrons of at least $10^{-25}$ m$^2$.

13. Device according to claim 12, wherein the hydrogenated material is polyethylene.

14. Device according to claim 12, wherein the converter is between 20 micrometres and 1 mm thick.

15. Device according to claim 12, wherein the atoms are implanted with a density between $10^{12}$ and $10^{18}$ atoms/cm$^2$.

16. Device according to claim 12, wherein the atoms are implanted at an implantation depth between 0.1 and 0.5 micrometer.

* * * * *